United States Patent
Xue et al.

(10) Patent No.: US 7,379,144 B1
(45) Date of Patent: May 27, 2008

(54) CHEVRON-FREE FLC DEVICE

(75) Inventors: Jiuzhi Xue, Broomfield, CO (US); Beth L. Ellis, Boulder, CO (US); Stephen H. Perlmutter, Lafayette, CO (US); Charles Crandall, Tucson, AZ (US)

(73) Assignee: Displaytech, Inc., Longmont, CO (US)

( * ) Notice: Subject to any disclaimer, the term of this patent is extended or adjusted under 35 U.S.C. 154(b) by 1576 days.

(21) Appl. No.: 09/591,437

(22) Filed: Jun. 9, 2000

(51) Int. Cl.
*G02F 1/141* (2006.01)

(52) U.S. Cl. ............... 349/134; 349/133; 349/123; 349/172

(58) Field of Classification Search ............ 349/133, 349/134, 123, 126, 130, 132, 131, 128, 172, 349/174, 179; 350/346
See application file for complete search history.

(56) References Cited

U.S. PATENT DOCUMENTS

| | | | |
|---|---|---|---|
| 4,367,924 A | | 1/1983 | Clark et al. |
| 4,563,059 A | | 1/1986 | Clark et al. |
| 4,778,259 A | * | 10/1988 | Kitayama et al. |
| 4,900,132 A | * | 2/1990 | Bos ............... 350/346 |
| 5,172,257 A | * | 12/1992 | Patel |
| 5,323,253 A | * | 6/1994 | Iwayama et al. ......... 349/133 |
| 6,141,076 A | * | 10/2000 | Liu et al. ............. 349/134 |

OTHER PUBLICATIONS

D. Williams and L. E. Davis, "Alignment of chiral smectic liquid crystals," J. Phys. D: Appl. Phys. 19 (1986) pp. L37-L41.

* cited by examiner

Primary Examiner—Thoi V. Duong
(74) Attorney, Agent, or Firm—Robert G. Crouch; Marsh, Fischmann & Breyfogle, LLP

(57) ABSTRACT

An optical device includes a ferroelectric liquid crystal material. This optical device has a first and a second substrate. A first alignment treatment is applied to a surface of the first substrate, the first alignment treatment being intended to induce an orientation of at least a portion of the ferroelectric liquid crystal material along a first alignment direction with a first pretilt angle $\alpha_1$ with respect to a plane parallel to the first substrate. A second alignment treatment is applied to a surface of the second substrate, the second alignment treatment being intended to induce an orientation of at least another portion of the ferroelectric liquid crystal material along a second alignment direction with a second pretilt angle $\alpha_2$ with respect to a plane parallel to the second substrate. The optical device further includes an arrangement for securing the first substrate with respect to the second substrate in such a way that the surfaces of the first and second substrates onto which the first and second alignment treatments were applied, respectively, are spaced apart, generally parallel and facing each other. In addition, a projection of the first alignment direction onto the treated surface of the first substrate makes a non-zero angle $\Omega$ with respect to a projection of the second alignment direction onto the treated surface of the first substrate such that, the ferroelectric liquid crystal material being injected between the first and second substrates, the optical device is free of chevron structures without a need to otherwise apply an additional treatment to the optical device.

32 Claims, 5 Drawing Sheets

CHEVRON-FREE FLC DEVICE

BACKGROUND OF THE INVENTION

The present invention relates generally to optical devices based on liquid crystals and more specifically to an optical device which is based on ferroelectric liquid crystal (FLC) materials and is generally free of chevron structures.

Optical devices based on surface-stabilized ferroelectric liquid crystal (SSFLC) structures have gathered considerable scientific and commercial interest in recent years. As is well known in the art, when confined between a pair of substrates, FLC molecules tend to become oriented in layers, which are called smectic layers. In the Smectic C phase, the long axis, or director, of each FLC molecule is generally tilted at an angle with respect to the smectic layers.

Turning now to the drawings, wherein like components are indicated by like reference numbers throughout the various figures, attention is immediately directed to FIG. 1A, which illustrates the smectic layer structure of an FLC material, generally indicated by reference number 10. As can be seen in FIG. 1A, FLC molecules 20 of FLC material 10 form smectic layers 22, with the director of each FLC molecule being tilted at an angle $\theta_0$ with respect to smectic layers 22. Although this angle $\theta_0$ with respect to the smectic layers remains constant among the FLC molecules, the director orientation of the FLC molecules rotates on a conical surface 24 with cone angle $\theta_0$ through the successive layers. In other words, FLC molecules 20 have a natural tendency to form a helical structure along an axis 28 with each FLC molecule lying in a slightly displaced position on the conical surface 24 relative to FLC molecules in adjacent layers. It should be noted that each FLC molecule possesses a polarization 26 which is perpendicular to the director of the molecule. The presence of polarization 26 becomes important when an electric field is applied across the FLC material, as will be described hereinafter at an appropriate point in the discussion.

Turning now to FIG. 1B, the suppression of the formation of helical structures in an SSFLC device is illustrated. FLC material 10 is confined between parallel substrates 32. When the spacing between the substrates is reduced to a few microns, the helical rotation of the director through the layers is prevented by the interaction of the molecules with the inner surfaces of the confining substrates. As shown in FIG. 1B, FLC molecules 20 in an SSFLC configuration become confined to one of two positions, A and B, which are parallel to the substrates on a cross section parallel to the substrate surfaces of a conical surface 24' with cone angle θ. The cone angle θ is generally smaller than $\theta_0$ due to the interaction of the FLC molecules with the substrates. Smectic layers 22' are also of a slightly different width in comparison to smectic layers 22 of FIG. 1A due to the difference in cone angles. The projection of the director of each FLC molecule 20 onto the plane of substrate 32 is shown as line 20'. It should be noted that each projection, represented by line 20', makes an angle θ with respect to a line 28', which is a projection of axis 28 onto the plane of substrate 32. As shown in FIG. 1B, the projection of the director of an FLC molecule in position B makes an angle 2θ with respect to the projection of the director of an FLC molecule in position A.

The two molecular positions A and B give rise to two possible optical states in the SSFLC device. Due to the symmetry of the system, the FLC molecules are generally stable in either of these optical states, and, as a result, the SSFLC device produces bistable optical states. The molecular positions A and B are respectively associated with the DOWN orientation of polarization 26 and the UP orientation of polarization 26 indicated by arrows 34 and 36, respectively. Since polarization 26 of each FLC molecule 20 tends to align along the direction of an electric field applied across the FLC material, the molecular position of the FLC molecule can be switched between positions A and B on conical surface 24' by applying an electric field in the UP direction or in the DOWN direction. In this way, the SSFLC device can be switched between the two optical states by applying an electric field across the FLC molecules between the substrates in the UP and DOWN directions.

Conventional SSFLC structures have certain inherent drawbacks. One such drawback is the fact that the device can only be in one of two optical states. Unlike nematic liquid crystal (NLC) devices, which is capable of analog operation by generating a continuum of optical states between a minimum and a maximum state according to the magnitude of the electric field applied across the NLC material, SSFLC devices are limited to binary operation in which one of two optical states is generated according to whether a positive or negative magnitude electric field is applied across the FLC material. Since molecular positions between positions A and B are not stable, optical states between the two stable states are not controllably accessible in a conventional SSFLC device. This inflexibility can be problematic especially in applications in which analog operation is desired.

Still another problem seen in the conventional SSFLC device is the presence of chevron structures. As commonly known in the art, chevron structures form in SSFLC devices due to the shrinkage of the smectic layers during the transition from a Smectic A (Sm A) phase to a Smectic C (Sm C) phase. Generally, in the assembly of a new SSFLC device, an FLC material is injected into the space between confining, parallel substrates at an elevated temperature such that the FLC material is in an isotropic phase. The SSFLC device is then gradually cooled such that the FLC material transitions from the isotropic phase through nematic and smectic phases. The smectic layers normally form when the FLC material is in the Sm A phase while the device temperature is still higher than room temperature. In the Sm A phase, the smectic layers are formed in the FLC material and the directors of the FLC molecules align perpendicularly to the smectic layers. As the SSFLC device is further cooled to room temperature the FLC material transitions to a chiral Smectic C (Sm C*) phase, in which the directors of the FLC molecules become tilted with respect to the smectic layers and are aligned on the conical surfaces. The smectic layers shrink slightly during the transition from the Sm A phase to the Sm C* phase due to the tilting of the FLC molecules with respect to the smectic layers. Due to conservation of mass and the structural boundary conditions, the shrinkage of the smectic layers results in the formation of chevron structures. The discontinuities between distinct domains of chevron structures pointing in opposing directions are optically visible as a zigzag pattern in the SSFLC device. Consequently, the presence of chevron structures gives rise to nonuniformity in the optical state produced by the device as a whole.

Prior efforts to eliminate the occurrence of chevron structures have included the application of an AC voltage pretreatment to the SSFLC device. The application of a predetermined AC voltage to the SSFLC device after the FLC material has been injected between the substrates has the effect of "kicking" the FLC molecules into uniform alignment, thus straightening the smectic layers and eliminating the chevron structures. The use of the AC voltage pretreatment adds an extra step to the manufacturing process of the SSFLC device, thus lead to additional costs associated with the device assembly. Furthermore, the use of the AC voltage pretreatment often results in smectic layer undulation in the plane of the substrate, thus yielding an SSFLC device with lower contrast and generally poor performance.

Another approach for eliminating chevron structures is the use of special FLC materials that do not have a Sm A phase. These special materials have the property that no shrinking of the smectic layers takes place during the phase transition into the Sm C* phase, hence the occurrence of chevron structures is prevented. Unfortunately, such FLC materials are not commonly used in commercial applications because it is generally more difficult to achieve uniform alignment of these special FLC materials in comparison to conventional FLC materials. Also, there are fewer examples of these materials available commercially.

Another problem with the conventional SSFLC device is the instability of the two optical states associated with molecular positions A and B due to the fact that the FLC molecules adjacent to the inner surface of the substrates do not switch and also due to the presence of chevron structures.

Yet another drawback of the conventional SSFLC device is variation in the optical retardance of the device during switching between the two optical states. Referring again to FIG. 1B, although the helical structures are suppressed, FLC molecules 20 still tend to rotate about conical surface 24' in switching from position A to position B and vice versa in the direction of residual twist. This characteristic is commonly referred to as cone switching of FLC molecules. Since optical retardance of the SSFLC device is generally proportional to the length of the projection of the FLC molecule director onto the substrate plane, the symmetry of the system provides that the optical retardance of the SSFLC device when the FLC molecules are in position A is the same as that when the FLC molecules are in position B. However, the optical retardance changes during cone switching since the length of the projection of the FLC molecule director varies as the FLC molecule rotates around the cone. Although the switching between positions A and B normally takes 100 µs or less, this effect of optical retardance variation can be problematic in certain applications requiring constant optical retardance.

In an effort to counter some of the aforedescribed problems of the conventional SSFLC device, Kitayama discloses in U.S. Pat. No. 4,778,259 a method for stabilizing the optical states of an SSFLC structure. By offsetting the alignment axes of the top and bottom substrates by a small, non-zero angle, an additional molecular twist is introduced in the FLC material to counter the aforementioned, inherent twist of the FLC, thus further stabilizing the optical states of the resulting SSFLC device. Kitayama also uses an AC voltage treatment to achieve full cone switching (i.e., use the full cone angle of $\theta_0$ rather than $\theta<\theta_0$). In U.S. Pat. No. 5,172,257, Patel takes the idea of the offset twist further by orienting the alignment axes of the alignment layers formed on the top and bottom substrates perpendicularly to one another. The alignment layers provide "strong anchoring" of the FLC molecules adjacent to the alignment layers such that the FLC molecules align in one of the two stable positions in parallel to the respective alignment axes with a 90° angle between the molecules near the top surface and those near the bottom surface. Thus, the natural twist of the FLC molecules is enhanced and an FLC device analogous to a twisted nematic device is achieved. The device disclosed in Patel is capable of exhibiting grayscale by continuously varying the applied electric field, thus changing the twist of the FLC molecule between the top and bottom substrates. In other words, the FLC device according to Patel is an analog device, which is capable of exhibiting continuously variable, not bistable, optical states. However, it is submitted that the device disclosed in Patel has a number of disadvantages. A special FLC material with $\theta_0=45°$ is required and the overall device tends to exhibit multiple domains that must be made uniform by use of an AC voltage pre-treatment. In addition, neither Kitayama nor Patel specifically addresses the problems of chevron structures and optical retardance variation in SSFLC devices.

As will be seen hereinafter, the present invention provides a heretofore unseen and highly advantageous approach with regard to achieving an FLC-based optical device while eliminating the problems present in prior art display systems.

SUMMARY OF THE INVENTION

As will be described in more detail hereinafter, an optical device including a ferroelectric liquid crystal material is herein disclosed. In one aspect of the invention, the optical device includes a first and a second substrate. A first alignment treatment is applied to a surface of the first substrate, the first alignment treatment being intended to induce an orientation of at least a portion of the ferroelectric liquid crystal material along a first alignment direction with a first pretilt angle $\alpha_1$ with respect to a plane parallel to the first substrate. A second alignment treatment is applied to a surface of the second substrate, the second alignment treatment being intended to induce an orientation of at least another portion of the ferroelectric liquid crystal material along a second alignment direction with a second pretilt angle $\alpha 2$ with respect to a plane parallel to the second substrate. The optical device further includes an arrangement for securing the first substrate with respect to the second substrate in such a way that the surfaces of the first and second substrates onto which the first and second alignment treatments were applied, respectively, are spaced apart, generally parallel and facing each other. In addition, a projection of the first alignment direction onto the treated surface of the first substrate makes a non-zero angle $\Omega$ with respect to a projection of the second alignment direction onto the treated surface of the first substrate such that, the ferroelectric liquid crystal material being injected between the first and second substrates, the optical device is free of chevron structures without a need to otherwise apply an additional treatment to the optical device.

In another aspect of the invention, the optical device as described above is used in an optical system. The optical system further includes a light input directed at the optical device in such a way that the optical device in turn produces a light output of a particular optical state. Still further, the optical system includes an arrangement for electrically addressing the optical device in such a way that the particular optical state of the light output is continuously variable between a minimum optical state and a maximum optical state wherein an optical retardance of the optical device remains generally constant during the continuous variation of the optical state of the light output.

In still another aspect of the invention, a method for preventing formation of chevron structures in an optical device including a ferroelectric liquid crystal material is disclosed. Accordingly, a first and a second substrate are provided. A first alignment treatment is applied to a surface of the first substrate, the first alignment treatment being intended to induce an orientation of at least a portion of the ferroelectric liquid crystal material along a first alignment direction with a first pretilt angle $\alpha_1$ with respect to a plane parallel to the first substrate. A second alignment treatment is applied to a surface of the second substrate, the second alignment treatment being intended to induce an orientation of at least another portion of the electric liquid crystal material along a second alignment direction with a second pretilt angle $\alpha_2$ with respect to a plane parallel to the second substrate. The first substrate is secured with respect to the second substrate in such a way that the surfaces of the first and second substrates onto which the first and second alignment treatments were applied, respectively, are spaced apart, generally parallel and facing each other. In addition, the first and second substrates are oriented in such a way that a projection of the first alignment direction onto the treated surface of the first substrate makes a non-zero angle $\Omega$ with respect to a projection of the second alignment direction onto the treated surface of the first substrate. The ferroelectric liquid crystal material is injected between the first and second substrates such that the optical device is free of chevron structures without a need to otherwise apply an additional treatment to the optical device.

BRIEF DESCRIPTION OF THE DRAWINGS

The features of the present invention may best be understood by reference to the following descriptions of the embodiments together with the accompanying drawings.

DETAILED DESCRIPTION OF THE PREFERRED EMBODIMENTS

Figure 2:
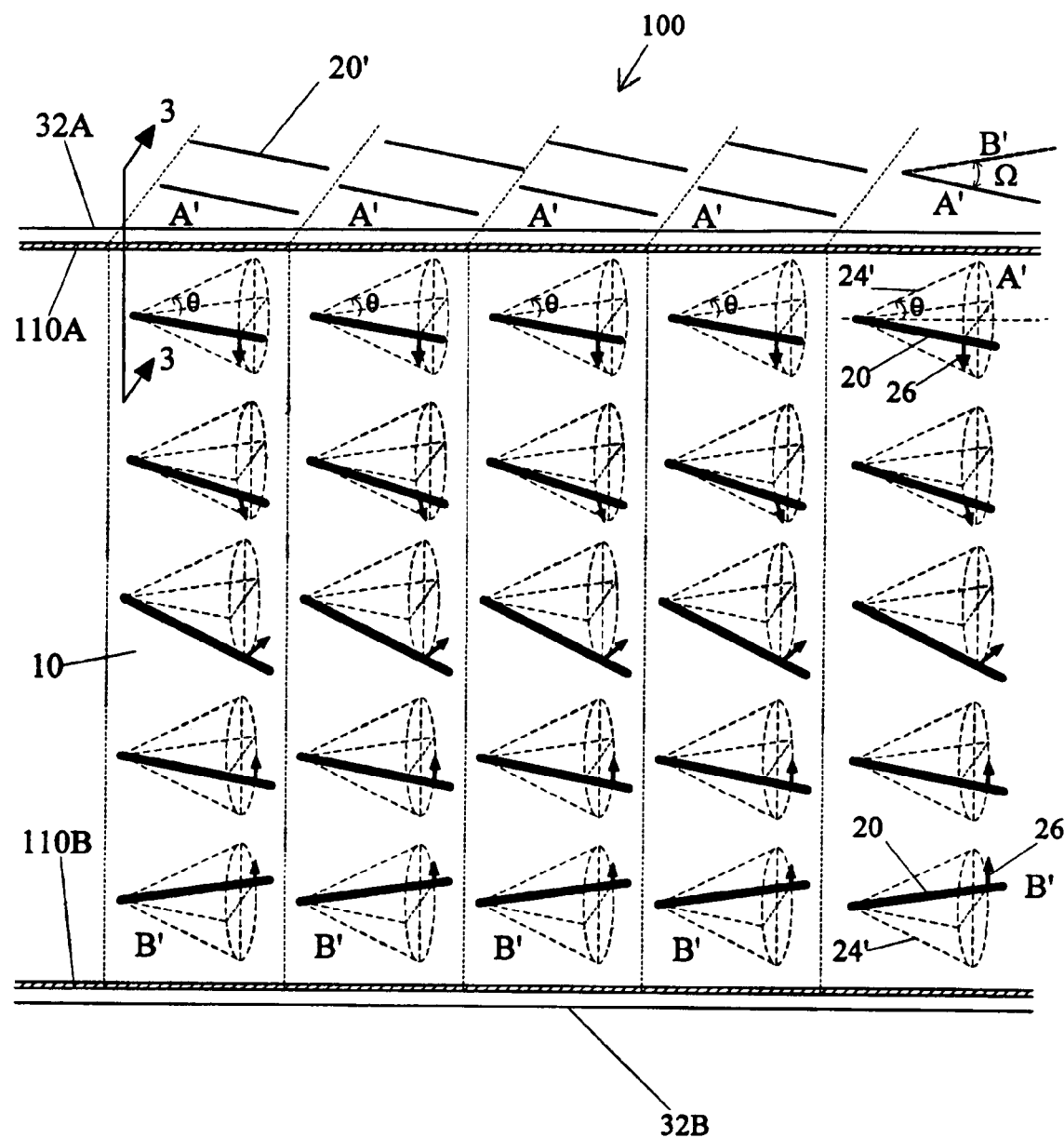
FIG. 2 is a perspective, partial cut-away view, in elevation, of one embodiment of an FLC device manufactured in accordance with the present invention shown here to illustrate the alignment of the FLC molecules in the device.

Attention is now directed to FIG. 2, which illustrates one embodiment of an FLC device, generally indicated by the reference number 100. FLC device 100 includes FLC material 10 confined between a top substrate 32A and a bottom substrate 32B. FLC device 100 also includes an alignment treatment 110A on the inner surface of top substrate 32A and an alignment treatment 110B on the inner surface of bottom substrate 32B. Alignment treatment 110A is designed to induce a predetermined molecular alignment of the portion of the FLC molecules which are located near the top substrate. Alignment treatment 110B is designed to induce a different, predetermined molecular alignment of the portion of the FLC molecules which are located near the bottom substrate. Alignment treatment 110A induces a molecular alignment such that the projection onto top substrate 32A of the director of an FLC molecule located immediately adjacent to top substrate 32A is oriented in a direction A' as shown in FIG. 2. Alignment treatment 110B induces a different molecular alignment such that the projection onto top substrate 32A of the director of an FLC molecule located immediately adjacent to bottom substrate 32B is oriented in a direction B'.

Induced molecular alignment directions at the top and bottom substrates are oriented in such a way that direction B' makes an angle $\Omega$ with direction A', as shown in FIG. 2. Angle $\Omega$ is chosen such that $\Omega \neq 0°$ nor $180°$, and, preferably, the value of $\Omega$ is selected such that $\Omega \geq 2\theta$. In this way, an offset is induced in the alignment of the FLC molecular directors near the top substrate and those near the bottom substrates.

The FLC molecules which are located away from top and bottom substrates 32A and 32B are aligned at different orientations between directions A' and B' on conical surfaces 24'. In other words, FLC molecules 20 gradually transition from being oriented in direction A' near top substrate 32A to being oriented in direction B' near bottom substrate 32B by rotating through the angle $\Omega$. Substrates 32A and 32B, including alignment treatments 110A and 110B, respectively, are assembled together such that the surfaces, on which alignment treatments are located, face each other and are spaced apart with uniform spacing between the substrates. The uniform spacing may be achieved by using conventional liquid crystal processing techniques such as, for example, the use of spacer spheres distributed between the substrates.

Figure 3:
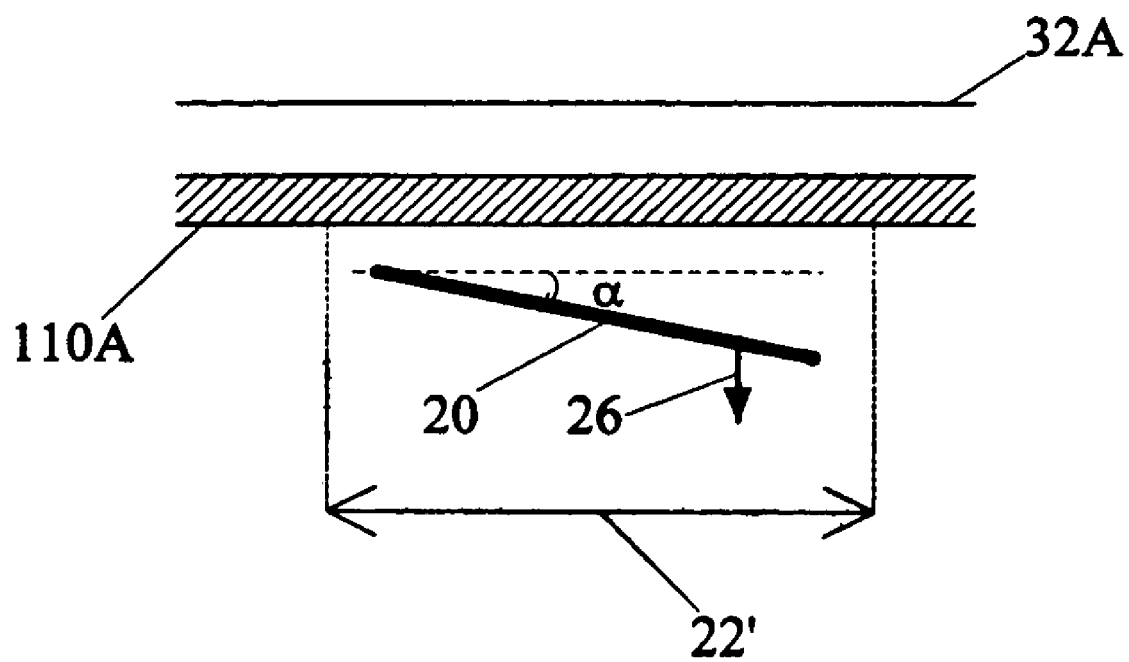
FIG. 3 is a partial cut-away view, in cross-section, of a portion of the FLC device of FIG. 2 shown here illustrate details of an FLC molecule alignment near a substrate.

Turning briefly to FIG. 3, which is a partial cut-away, cross-sectional view of a portion of FLC device 100 of FIG. 2, details of the alignment of an FLC molecule located immediately adjacent to alignment treatment 110A is illustrated. In addition to inducing a director alignment in direction A' as shown in FIG. 2, alignment treatment 110A is also designed to induce a molecular pretilt of angle $\alpha$, from a plane parallel to top substrate 32A. Alignment treatment 110B is similarly designed to ensure director alignment of FLC molecules located near bottom substrate 32B in direction B' with a pretilt angle $\alpha$. It should be noted that the pretilt angles at the top and bottom substrates may be configured to be equal such that $\alpha_1 = \alpha_2$.

The combination of the induced director orientation offset angle $\Omega$ between the top and bottom substrates and the FLC molecular pretilt angle $\alpha_1$ or $\alpha_2$ near the alignment treatment surfaces in the present embodiment works to break the aforedescribed symmetry between the bistable positions A' and B' of FLC molecules 20 on conical surface 24' in such a way that position A' is favored near the top substrate and position B' is favored near the bottom substrate during the smectic layer shrinkage process. In addition, since the rotation of the FLC molecules from the top substrate to the bottom substrate in effect results in a pre-stretching of the smectic layers in the Sm A phase, additional shrinkage of the smectic layers during the transition into the Sm C* phase is minimized. As a result, the FLC device of the present invention is remarkably free of chevron structures. No additional pre-treatment, such as the application of an AC voltage, is required to eliminate chevron structures. Furthermore, conventional FLC materials (i.e., materials with a Sm A phase) can be used in the aforedescribed embodiment since the specification of the offset angle $\Omega$ and pretilt angle $\alpha$ will result in an essentially chevron-free FLC device Turning now to FIG. 4, a schematic of one of a series of test FLC devices manufactured in accordance with the present invention is illustrated. The test FLC device, generally indicated by reference numeral 300, includes a top substrate 332A and a bottom substrate 332B. Transparent glass substrates are used in the test device. Other substrates such as, for example, silicon substrates may also be used. The top and bottom substrates of the test device include transparent electrodes 334A and 334B, respectively.

Figure 4:
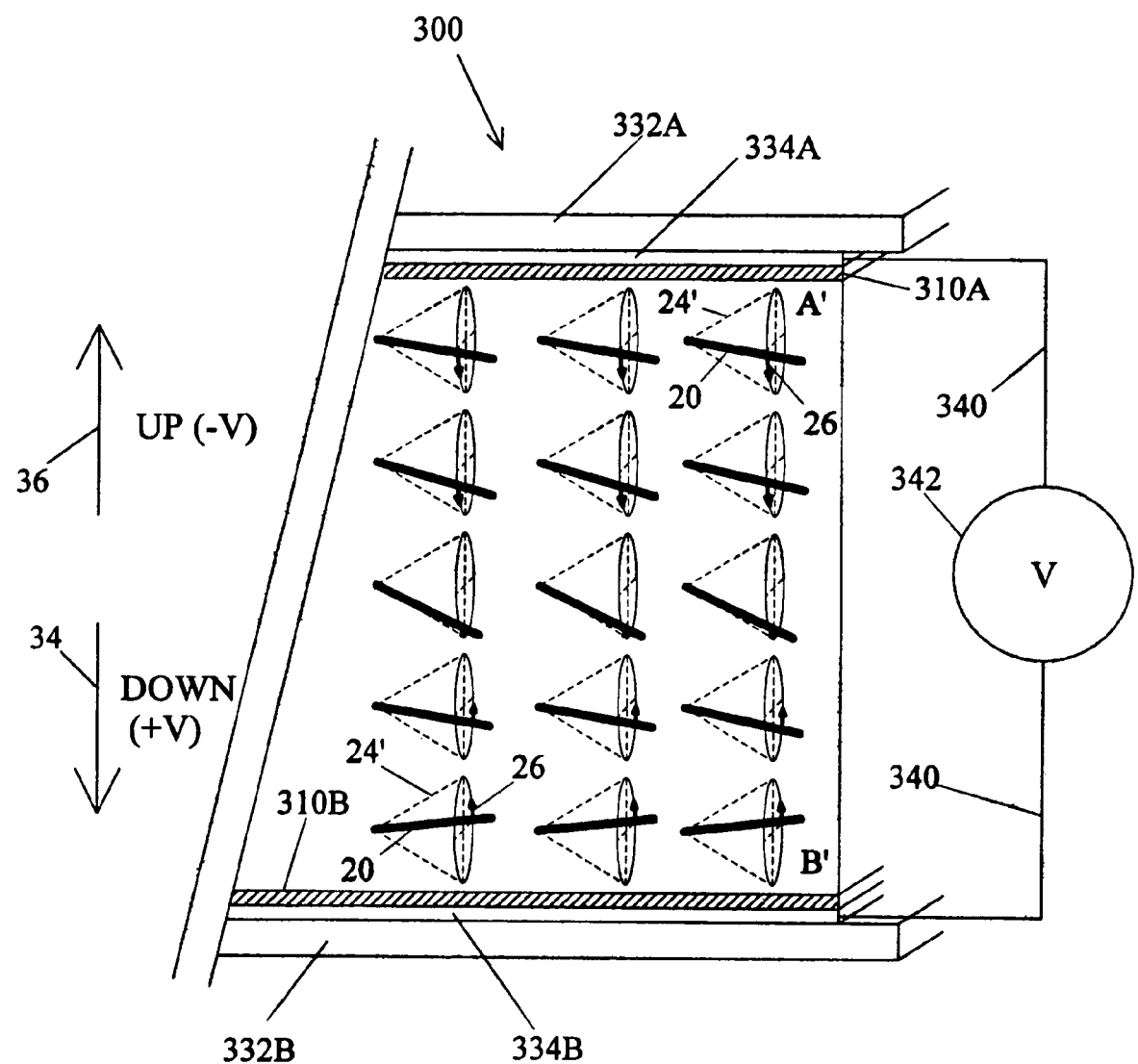
FIG. 4 is a perspective, partial cut-away view, in cross-section, of a test FLC device manufactured in accordance with the present invention.

Continuing to refer to FIG. 4, the top and bottom substrates further include alignment layers 310A and 310B, respectively. In the test device, a thin film of a polyimide material (SE610 manufactured by Nissan) is used as the alignment layer material. The polyimide film is formed on the ITO-coated substrates by spin-coating the cleaned substrates with a 2% solution of the polyimide material with the spin coater set at 3500 RPM for 30 seconds. The polyimide-coated substrates are pre-baked at 80° C. for 15 minutes then post-baked at 250° C. for 60 minutes. The thickness of the resulting polyimide film is approximately 200 Å. The baked substrates are cooled, then the coated surfaces are unidirectionally rubbed using a buffing wheel at a rubbing density of 150 and pile contact of approximately 450 µm (rubbing density being defined as the ratio of the speed of the buffing wheel to the speed of the stage on which the substrate is placed). The direction in which the alignment layer is rubbed determines the orientation of the FLC molecular director induced at the substrate. The polyimide film also induces a molecular pretilt of $\alpha=7°$ from a plane parallel to the substrate surface.

Still referring to FIG. 4, top and bottom substrates 332A and 332B are brought together and secured with the coated surfaces facing each other and a uniform spacing between the substrates in a cell configuration. The substrates of the illustrated test device are oriented such that the rubbing directions of the top and bottom substrates form an angle of 45° with respect to each other (i.e., the angle between the rubbing direction A' and rubbing direction B' makes the angle $\Omega=45°$). In the test device, uniform spacing is achieved by spraying spherical spacers of 1 µm diameter over one of the substrates before bringing the substrates together, as is commonly done in liquid crystal device processing. A perimeter sealant secures the two substrates together while leaving small openings for injection of the FLC material.

The space between the assembled substrates is filled with a commercial FLC material (CS1025 available from Chisso Chemicals) in the isotropic phase in a vacuum fill chamber. CS 1025 has a cone angle of $\theta_0=22°$ in the Sm C* phase at room temperature and has the following phase sequence (the transition temperatures are indicated in parentheses):

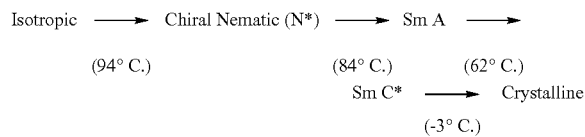

The filled test device is gradually cooled at a controlled rate of approximately 1° C./minute. The FLC material transitions through the nematic and Sm A phases during the cool down process to result in the Sm C* phase at room temperature. Finally, electronic leads 340 are attached to electrodes 334A and 334B to allow the connection of a voltage source 342 to the final FLC device. When voltage source is activated to produce a voltage difference between the top and bottom electrodes, an electric field associated with the voltage difference is applied across the FLC material therebetween.

Although a specific device fabrication procedure is described, it should be understood that the device fabrication procedure described above is only one example of manufacturing an FLC device in accordance with the present invention, and equivalent devices may be achieved in a wide variety of ways. For instance, other suitable materials, such as, but not limited to, a thin film of polyvinyl alcohol, nylon or obliquely evaporated silicon dioxide, that provides a known molecular pretilt may be used in place of the polyimide as the alignment layer material. Furthermore, the aforedescribed processing procedure for the polyimide material is only one of any number of possible processing procedures to controllably achieve a variety of molecular pretilt angles. For example, the specific details of the coating, curing and rubbing procedures may be varied to obtain molecular pretilt angles other than a $\alpha=7°$. Variation in the molecular pretilt angle may be desired when using an alternative FLC material other than CS1025, such as, for example, CS1026 or SCE-7. For instance, it has been found through testing of the structure of the present invention using experimental FLC mixtures that FLC mixtures with three phenyl rings in the molecular structure is particularly suited for the present invention. Still further, other combinations of molecular pretilt angle $\alpha$ and rubbing direction offset angle $\Omega$ values, other than those values used in the test FLC device, may also be used while remaining within the scope of the present invention.

Remarkably, when examined under a polarizing microscope without an applied voltage from voltage source 342, the test device as illustrated in FIG. 4 exhibits no zigzag patterns, which are indicative of the presence of chevron structures and shows a uniform bluish color across the aperture of the device. These observations indicate that the device includes a layer of FLC material of a uniform thickness and is essentially free of chevron structures. Moreover, when a voltage is applied across the FLC material, no layer damage nor other known defects are observed using the polarizing microscope, thus further indicating the absence of chevron structures.

When an electric field is applied between the top and bottom substrates of test FLC device 300, the test FLC device exhibits a unique, unanticipated optical behavior. The test FLC device manufactured in accordance with the present invention exhibits a continuous variation of optical states depending on the strength of the applied electric field. Furthermore, the optical retardance of the test FLC device remains essentially constant during the optical state variation, as will be described in detail immediately hereinafter.

In addition to inducing a particular FLC molecular director orientation with a pretilt angle, the alignment treatments on the top and bottom substrates are designed to provide strong anchoring of the FLC molecules in the intended orientation directions. A strong surface interaction between the alignment treatments and the FLC molecules immediately adjacent to the alignment treatments ensures that the FLC molecules in close proximity of the substrates are generally anchored with their directors pointing along the intended orientation directions. Strong molecular anchoring is evidenced in the present embodiment by the fact that a $+\Omega$ angle from direction A' to direction B' produces the same optical response from the device as an angle $-\Omega$ from direction A' to direction B' when an electric field is applied across the FLC material. This characteristic is in contrast to the weak molecular anchoring indicated in the prior art device of Kitayama since, in the device of Kitayama, the offset angle must be set at a small, non-zero angle to balance the polar surface anchoring of the substrates.

As described in the foregoing discussion, the polarization of the FLC molecules tend to align along the direction of applied electric field. The exact orientation of polarization 26, and hence the position of each FLC molecule 20 on conical surface 24', depends on the strength of the applied electric field and the proximity of that particular FLC molecule to the alignment treatments on the substrates. The strong anchoring of the FLC molecules near a substrate forces the FLC molecules immediately adjacent to an alignment treatment surface to remain in the position induced by the alignment treatment regardless of the applied electric field. The FLC molecules farther away from the substrates, however, are less constrained by their interaction with alignment treatments and will rotate about the conical surfaces to align with the applied electric field. Therefore, the polarization of FLC molecules around halfway between the two substrates will align with the applied electric field at smaller field magnitudes, and more FLC molecules will rotate at strong electric fields. As a result, the FLC device of the present invention exhibits a continuous variation of optical state depending on the strength of the applied electric field.

Furthermore, the Applicants have experimentally verified that the FLC device of the present invention exhibits essentially no change in optical retardance during optical state variation by application of electric field. This behavior is in contrast to that of conventional SSFLC devices in which the optical retardance changes during cone switching since the length of the projection of the FLC molecule director varies during rotation around the cone, and it is advantageous in applications that require constant optical retardance during device operation.

Figure 5:
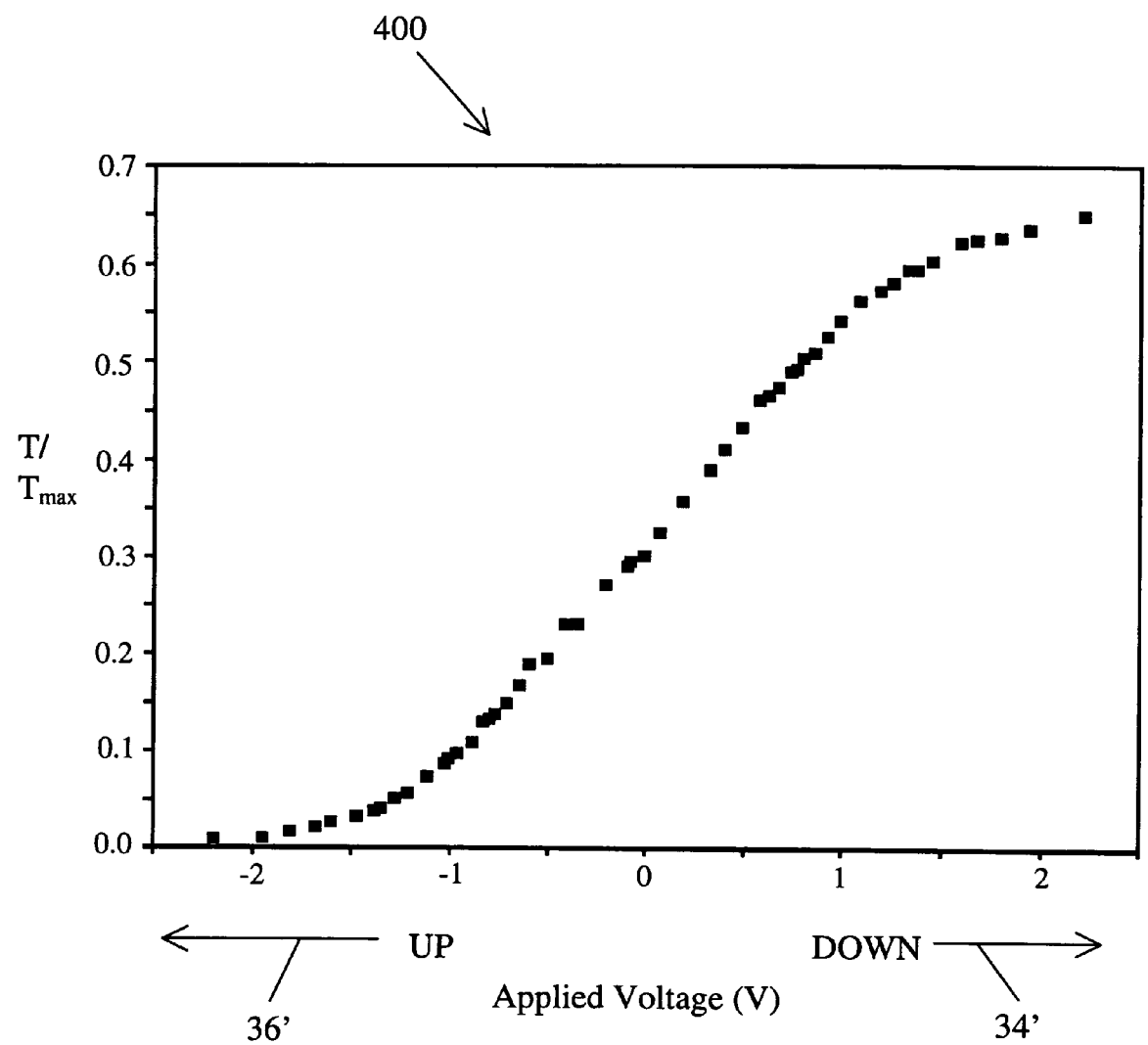
FIG. 5 is a graph of transmission ratio ($T/T_{max}$) as a function of applied voltage for the test device of FIG. 4 shown here to illustrate the electro-optic response of the test device.

Turning now to FIG. 5 in conjunction with FIG. 4, the electro-optic response of the test FLC device is illustrated. FIG. 5 is a graph of the transmission ratio ($T/T_{max}$) versus the applied voltage of the test FLC device of FIG. 4, the graph being generally indicated by reference numeral 400. The measurements are taken with the test FLC device placed between two polarizers with the optical axes of the polarizers arranged with respect to the test FLC device in such a way that a large applied voltage in the UP direction (−V) yields the minimum transmission ratio. As can be seen in graph 400, the transmission ratio gradually increases as the applied voltage is increased from less than −2V up to +2V. The increase in transmission ratio saturates at a value near 0.65 for applied voltage values larger than approximately +2V.

A significant characteristic of the electro-optic response as shown in FIG. 5 is the fact that the transmission ratio gradually increases from a minimum value (near 0.0) to a maximum value (near 0.65) with increasing applied voltage. The test FLC device is capable of yielding transmission ratios between the minimum and maximum values with the application of voltages between −2V and +2V.

Figure 1A:
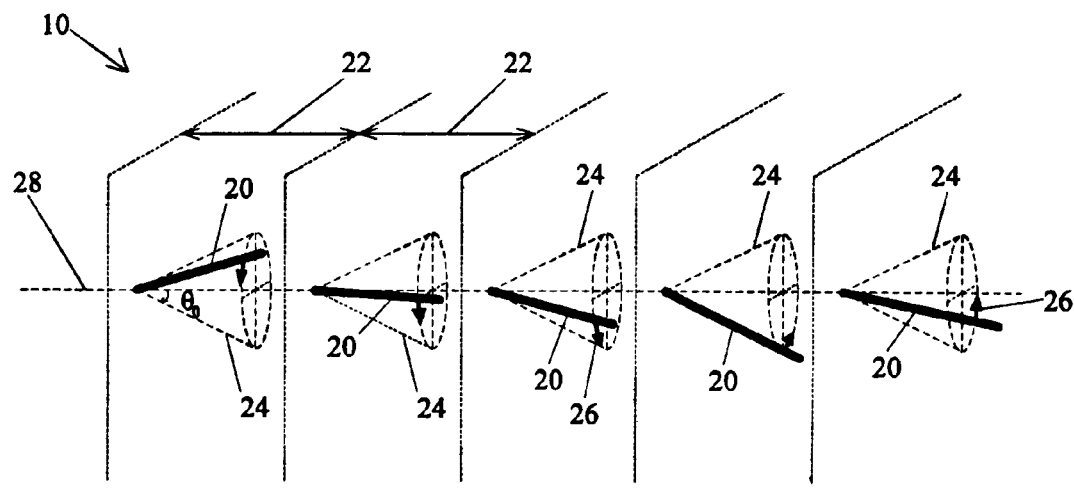
FIG. 1A is a perspective, partial cut-away view, in elevation, of an FLC material shown here to illustrate a helical structure formed by conventional FLC molecules through smectic layers.
Figure 1B:
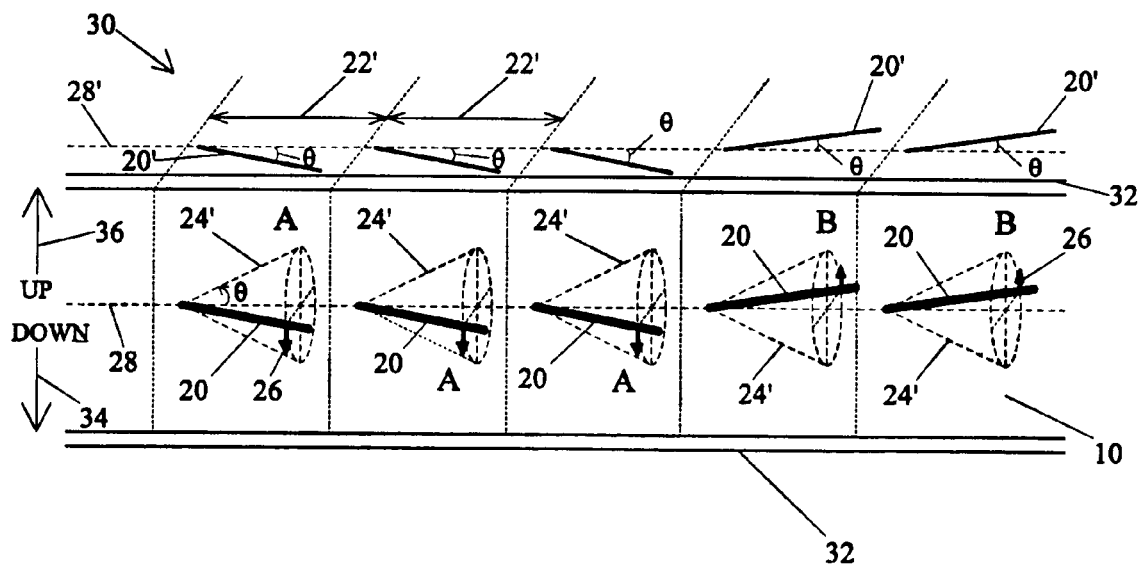
FIG. 1B is a perspective, partial cut-away view, in elevation, of an SSFLC device shown here to illustrate the suppression of the helical structure of the FLC molecules in the SSFLC device.

The behavior of the test FLC device is in contrast to that of the aforedescribed conventional SSFLC device. In the conventional SSFLC device, the FLC molecules are collectively switched between the A and B positions as shown in FIG. 1B by the application of an UP voltage, thus yielding only two possible optical states, such as a minimum and a maximum transmission ratio value respectively associated with the A and B positions. In other words, in the conventional SSFLC device, transmission ratio values between the minimum and maximum values are not accessible with the application of voltages between the minimum and maximum voltage values. However, the test FLC device is capable of yielding a continuum of optical states, that is, transmission ratio values, between the minimum and maximum values.

It should be noted that the fabrication procedure of the test FLC device outlined above is essentially the same as the normal fabrication procedure of conventional SSFLC devices. However, unlike conventional SSFLC devices, the proper choice of alignment layer material and alignment offset angle between the top and bottom substrates ensures that the FLC device according to the present invention is essentially free of chevron structures. Unlike the conventional SSFLC device, the test FLC device is essentially free of chevron structures and no change in optical retardance is observed during voltage application. Furthermore, the test FLC device manufactured in accordance with the present invention as shown in FIG. 4 is capable of analog operation by continuously varying the applied voltage between the minimum and maximum values. Still further, the aforedescribed properties are achievable using commercially available FLC mixtures. These characteristics enable the use of the FLC device of the present invention to be used to display grayscale using conventional FLC materials.

Moreover, the FLC device according to the present invention may still be operated as a binary FLC device yielding two optically distinctive states (such as maximum and minimum transmission states). When used as binary FLC device, the FLC device of the present invention has the advantage that no defects related to the presence of chevron structures arise during operation. Specifically, defects such as "boat wakes," as is commonly known in the art, are eliminated.

To the Applicant's knowledge, such an FLC device as described above, which is generally free of chevron structures without a need for special materials or additional pre-treatment after the device has been assembled, is not available. In addition, the FLC device manufactured in accordance with the present invention is also capable of continuous optical state variation according to variation in the magnitude of the applied electric field. Furthermore, the FLC device of the present invention exhibits essentially no change in optical retardance during optical state variation.

Although each of the above described embodiments have been illustrated with the various components having particular respective orientations, it should be understood that the present invention may take on a variety of specific configurations with the various components being located in a wide variety of positions and mutual orientations and still remain within the scope of the present invention. Furthermore, suitable equivalents may be used in place of or in addition to the various components, the function and use of such substitute or additional components being held to be familiar to those skilled in the art and are therefore regarded as falling within the scope of the present invention. For example, photo-buffing, or the application of UV light at an oblique angle to an alignment layer, may be used to induce molecular alignment near the substrate surfaces. Therefore, the present examples are to be considered as illustrative and not restrictive, and the invention is not to be limited to the details given herein but may be modified within the scope of the appended claims.

What is claimed is:

1. An optical device including a ferroelectric liquid crystal material, said optical device comprising:
   a first substrate and a second substrate;
   a first alignment treatment applied to a surface of the first substrate, said first alignment treatment being intended to induce an orientation of at least a portion of said ferroelectric liquid crystal material along a first alignment direction and with a first pretilt angle $\alpha 1$ with respect to a plane parallel to said first substrate;
   a second alignment treatment applied to a surface of the second substrate, said second alignment treatment being intended to induce an orientation of at least another portion of said ferroelectric liquid crystal material along a second alignment direction and with a second pretilt angle $\alpha 2$ with respect to a plane parallel to said second substrate;
   a light input directed at said optical device in such a way that the optical device in turn produces a light output of a particular optical state; and
   means for electrically addressing said optical device in such a way that the particular optical state of the light output is continuously variable between a minimum optical state and a maximum optical state;
   wherein the first substrate is located with respect to the second substrate in such a way that the surfaces of the first and second substrates onto which the first and second alignment treatments were applied, respectively, are spaced apart, generally parallel and facing each other and a projection of the first alignment direction onto the treated surface of the first substrate makes a non-zero angle $\Omega$ with respect to a projection of the second alignment direction onto the treated surface of the first substrate such that, said ferroelectric liquid crystal material being injected between the first and second substrates, the optical device is free of chevron structures without a need to otherwise apply an additional treatment to the optical device;
   wherein an optical retardance of the optical device remains generally constant during said continuous variation of the optical state of the light output.

2. An optical device of claim 1 wherein said ferroelectric liquid crystal material has a phase sequence of Isotropic-Nematic-Smectic A-Smectic C*-Crystalline states.

3. An optical device of claim 1 wherein said ferroelectric liquid crystal material having a cone angle $\theta$, said non-zero angle $\Omega$ has a predetermined value such that $\Omega \geq 2\theta$ and $\Omega \neq 180°$.

4. An optical device of claim 1 wherein said first and second alignment treatments are specifically chosen so as to specifically induce pretilt angles of $\alpha 1$ and $\alpha 2$, respectively.

5. An optical device of claim 4 wherein said first alignment treatment includes a coating of a selected alignment material, said coating being applied, cured and treated so as to specifically induce the pretilt angle of $\alpha 1$.

6. An optical device of claim 5 wherein said second alignment treatment includes a coating of another selected alignment material, said coating being applied, cured and treated so as to specifically induce the pretilt angle of $\alpha 2$.

7. An optical device of claim 4 wherein each of said pretilt angles is at most 10°.

8. An optical device of claim 4 wherein said first and second alignment treatments are generally identical.

9. An optical device of claim 1 wherein said first and second alignment treatments provide strong molecular anchoring of at least portions of the ferroelectric liquid crystal material located immediately adjacent to the treated surfaces of the first and second substrates.

10. An optical device of claim 1 wherein said first substrate includes a reflective surface.

11. An optical system comprising:
   an optical device including
   a ferroelectric liquid crystal material,
   a first substrate and a second substrate,
   a first alignment treatment applied to a surface of the first substrate, said first alignment treatment being intended to induce an orientation of at least a portion of said ferroelectric liquid crystal material along a first alignment direction and with a first pretilt angle $\alpha 1$ with respect to a plane parallel to said first substrate,
   a second alignment treatment applied to a surface of the second substrate, said second alignment treatment being intended to induce an orientation of at least another portion of said ferroelectric liquid crystal material along a second alignment direction and with a second pretilt angle $\alpha 2$ with respect to a plane parallel to said second substrate, and
   wherein the first substrate is located with respect to the second substrate in such a way that the surfaces of the first and second substrates onto which the first and second alignment treatments were applied, respectively, are spaced apart, generally parallel and facing each other and a projection of the first alignment direction onto the treated surface of the first substrate makes a non-zero angle $\Omega$ with respect to a projection of the second alignment direction onto the treated surface of the first substrate such that, said ferroelectric liquid crystal material being injected between the first and second substrates, the optical device is free of chevron structures without a need to otherwise apply an additional treatment to the optical device;
   a light input directed at said optical device in such a way that the optical device in turn produces a light output of a particular optical state; and
   means for electrically addressing said optical device in such a way that the particular optical state of the light output is continuously variable between a minimum optical state and a maximum optical state wherein an optical retardance of the optical device remains generally constant during said continuous variation of the optical state of the light output.

12. An optical device of claim 11 wherein said ferroelectric liquid crystal material has a phase sequence of Isotropic-Nematic-Smectic A-Smectic C*-Crystalline states.

13. An optical device of claim 11 wherein said ferroelectric liquid crystal material having a cone angle $\theta$, said non-zero angle $\Omega$ has a predetermined value such that $\Omega \geq 2\theta$ and $\Omega \neq 180°$.

14. An optical device of claim 11 wherein said first and second alignment treatments are specifically chosen so as to specifically induce pretilt angles of $\alpha 1$ and $\alpha 2$, respectively.

15. An optical device of claim 14 wherein said first alignment treatment includes a coating of a selected alignment material, said coating being applied, cured and treated so as to specifically induce the pretilt angle of $\alpha 1$.

16. An optical device of claim 15 wherein said second alignment treatment includes a coating of another selected alignment material, said coating being applied, cured and treated so as to specifically induce the pretilt angle of $\alpha 2$.

17. An optical device of claim 14 wherein each of said pretilt angles is at most 10°.

18. An optical device of claim 14 wherein said first and second alignment treatments are generally identical.

19. An optical device of claim 11 wherein said first and second alignment treatments provide strong molecular anchoring of at least portions of the ferroelectric liquid crystal material located immediately adjacent to the treated surfaces of the first and second substrates.

20. An optical device of claim 11 wherein said first substrate includes a reflective surface.

21. An optical device including a ferroelectric liquid crystal material, said optical device comprising:
   a first substrate and a second substrate;
   a first alignment treatment applied to a surface of the first substrate, said first alignment treatment being intended to induce an orientation of at least a portion of said ferroelectric liquid crystal material along a first alignment direction and with a first pretilt angle α1 with respect to a plane parallel to said first substrate;
   a second alignment treatment applied to a surface of the second substrate, said second alignment treatment being intended to induce an orientation of at least another portion of said ferroelectric liquid crystal material along a second alignment direction and with a second pretilt angle α2 with respect to a plane parallel to said second substrate; and
   wherein the first substrate is located with respect to the second substrate in such a way that the surfaces of the first and second substrates onto which the first and second alignment treatments were applied, respectively, are spaced apart, generally parallel and facing each other and a projection of the first alignment direction onto the treated surface of the first substrate makes a non-zero angle Ω with respect to a projection of the second alignment direction onto the treated surface of the first substrate such that, said ferroelectric liquid crystal material being injected between the first and second substrates, the optical device is free of chevron structures without a need to otherwise apply an additional treatment to the optical device; and
   wherein the ferroelectric liquid crystal material in the optical device is surface stabilized.

22. An optical device of claim 21 wherein said ferroelectric liquid crystal material has a phase sequence of Isotropic-Nematic-Smectic A-Smectic C*-Crystalline states.

23. An optical device of claim 21 wherein said ferroelectric liquid crystal material having a cone angle θ, said non-zero angle Ω has a predetermined value such that $\Omega \geq 2\theta$ and $\Omega \neq 180°$.

24. An optical device of claim 21 wherein said first and second alignment treatments are specifically chosen so as to specifically induce pretilt angles of α1 and α2, respectively.

25. An optical device of claim 24 wherein said first alignment treatment includes a coating of a selected alignment material, said coating being applied, cured and treated so as to specifically induce the pretilt angle of α1.

26. An optical device of claim 25 wherein said second alignment treatment includes a coating of another selected alignment material, said coating being applied, cured and treated so as to specifically induce the pretilt angle of α2.

27. An optical device of claim 24 wherein each of said pretilt angles is at most 10°.

28. An optical device of claim 24 wherein said first and second alignment treatments are generally identical.

29. An optical device of claim 21 wherein said first and second alignment treatments provide strong molecular anchoring of at least portions of the ferroelectric liquid crystal material located immediately adjacent to the treated surfaces of the first and second substrates.

30. An optical device of claim 21, further including:
   a light input directed at said optical device in such a way that the optical device in turn produces a light output of a particular optical state; and
   means for electrically addressing said optical device in such a way that the particular optical state of the light output is continuously variable between a minimum optical state and a maximum optical state.

31. An optical device of claim 30, wherein an optical retardance of the optical device remains generally constant during said continuous variation of the optical state of the light output.

32. An optical device of claim 21 wherein said first substrate includes a reflective surface.

* * * * *